Feb. 14, 1956 P. G. PATER 2,734,572
CAMBER ADJUSTER FOR SQUARING SHEAR SLIDES
Filed Sept. 16, 1952
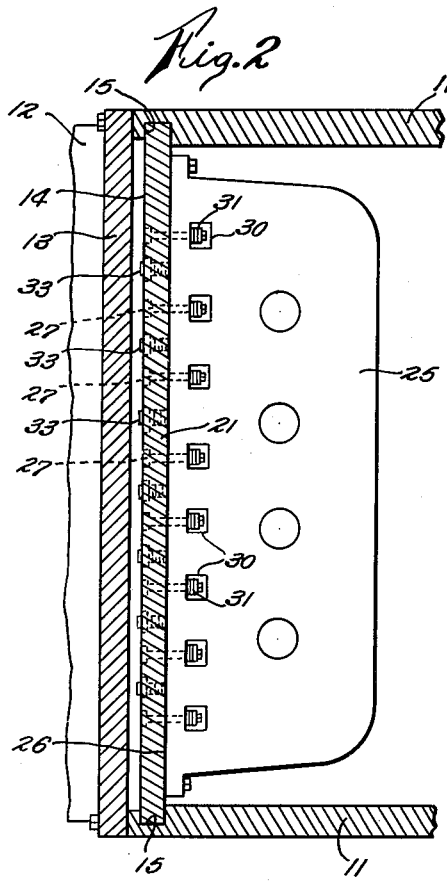
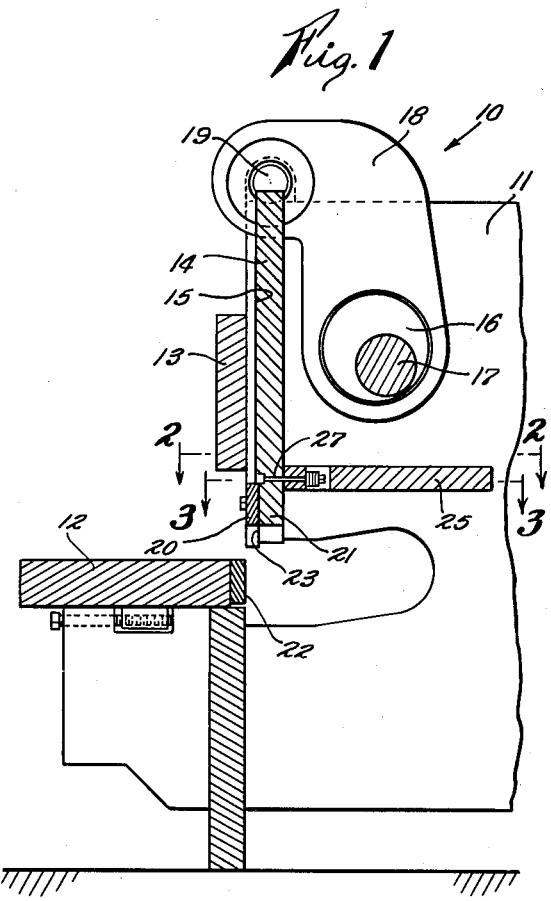
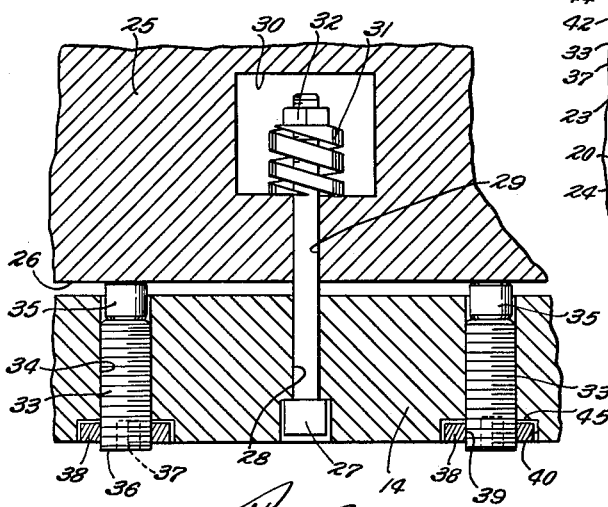
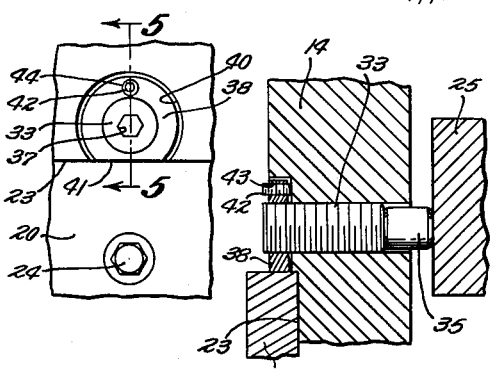
INVENTOR.
Paul G. Pater
BY
ATT'YS United States Patent Office 2,734,572
Patented Feb. 14, 1956

2,734,572

CAMBER ADJUSTER FOR SQUARING SHEAR SLIDES

Paul G. Pater, Hamilton, Ohio, assignor to Columbia Machinery and Engineering Corporation, Hamilton, Ohio Application September 16, 1952, Serial No. 309,764

3 Claims. (Cl. 164—58)

The present invention relates to a camber adjuster for squaring shear slides and has for its principal object the provision of a reliable and greatly simplified camber adjusting device which is readily regulatable by an operator whilst occupying his usual station along the front of the squaring shear.

Another object of this invention is to provide a novel locking means for a camber adjusting device with the foregoing characteristics which has a positive action, requires a single tool for its adjustment, and which will not disturb the setting of the camber adjustment screw when it is put under operative locking tension.

With the foregoing objects in view, my invention is embodied in preferable form, in the construction, arrangement and combination of parts hereinafter described, illustrated in the accompanying drawing, and set forth in the appended claims:

In the drawing:

Fig. 1 is a lateral section through a squaring shear equipped with the camber adjusting device of this invention.

Fig. 2 is a section taken on line 2—2 of Fig. 1.

Fig. 3 is an enlarged section taken on line 3—3 of Fig. 1.

Fig. 4 is a fragmental, front elevation of the camber adjustment as shown in Fig. 3.

Fig. 5 is a section taken on line 5—5 of Fig. 4.

It is well known that the cooperative cutting blades for squaring shears are apt to become misaligned during use and to thereby cause defective work due in part to a tendency of the metal cut therebetween to spread the blades apart in directions normal to the cut, such misalignment usually being greatest at the center of the blades thus causing bowing of one or both blades along their longitudinal extents. This bowing action is referred to in the trade and herein as "camber" and its rectification as "camber adjustment".

Briefly, in the practice of my invention, I provide a camber adjustment for squaring shear slides which includes a spaced row of resilient draw bolts located along the lower cutting blade attachment portion of an upstanding slide, and acting to secure to said portion the adjacent straight edge portion of a slide back brace which takes the form of a flat plate positioned substantially normal to the slide. A series of spaced adjustment screws are interposed in the row of draw bolts and are counteractive with respect to the latter such that the screws are effective to force the slide and brace apart against the resiliency of the draw bolts, each of said screws having a novel lock means and both the set screws and their lock means being readily accessible for adjustment by an operator standing in front of the shear.

With reference to the drawings I have shown a squaring shear 10 having side housings 11—11 supporting between them a bed plate 12 and connected across their upper portions by a front plate 13. An upstanding slide 14 is mounted in suitable guides 15—15 formed between the forward edges of the side housings and the front plate, said slide being reciprocated in the guides by at least two eccentrics 16 secured to a power driven shaft 17 journalled in the housings, the eccentrics being engaged by pitmans 18 which are pivotally connected at 19 to the upper end of the slide. A cutting blade 20 is mounted on the lower end portion 21 of the slide 14, and as best indicated in Fig. 1, said blade cooperates with a stationary cutter blade 22 fixed to the rear edge of the bed plate 12 to shear work supported upon the bed plate. The lower end portion 21 of the slide has milled in its front face an inset, blade engaging face 23 for mounting the movable cutting blade 20, said blade being secured against the said face by a longitudinal row of bolts 24 which pass through bores in the blade and are threaded in the body of the slide.

A slide back brace in the form of a flat plate 25 is disposed substantially normal to the slide 14 and has its forward edge 26 located adjacent the lower end 21 of the slide. The slide is connected to the back brace by a longitudinal row of spaced securing means which take the form of resilient draw bolts 27, each bolt passing through a countersunk bore 28 (Fig. 3) formed in the lower portion of the slide and through an aligned hole 29 in the back brace, said latter hole being formed through the forward edge of the brace and extending rearwardly to connect with a rout 30 formed heightwise through the brace. As best shown in Fig. 3 the threaded end of each draw bolt extends into a rout and is there encircled by a heavy duty, expansile spring 31, a nut 32 being threaded to the bolt end which when turned down thereon bears against the spring to place the said spring under tension between the nut and the outer wall of the rout and cause the draw bolt to urge the lower portion of the slide toward the forward edge of the brace. The combined capacities of the resilient draw bolts when put under stress by compression of their respective springs is sufficient, when properly controlled, to laterally flex or bow the body of the lower portion of the slide in a direction normal to the row along the longitudinal extent of the slide.

A series of adjustment screws 33 counteractive to the draw bolts 27 are alternated in the row of spaced slide-to-brace securing means. The construction of the adjustment screws is best understood by reference to Figs. 3–5 of the drawings wherein it will be seen that each screw cooperates with a threaded bore 34 formed through the slide 14, the inner end thereof exerting an operative thrust on the forward edge 26 of the brace 25 preferably by means of a pin 35 interposed between the inner end of the screw and the brace.

The outer end 36 of the screw extends from the front surface of the slide and has a tool engaging, hexagonal socket 37 formed in its front face, it being particularly understood that all the socket faces of the screws in the row are readily accessible for adjustment by an operator standing in front of the machine.

The lock means for each adjustment screw comprises a clamp plate 38 generally circular in form and having an internally threaded, centrally located aperture 39 for threaded engagement with the outer end 36 of the screw. The clamp plate is seated in a generally circular inset 40 formed in the outer face of the slide around each threaded bore 34, it being noted with respect to Fig. 5 that each clamp plate 38 is provided with a flat bottom portion 41, all of which abuts the upper edge of the cutting blade 20 when it is in its operative position on the slide. A clamp screw 42 is threaded through a bore 43 formed through each cam plate in a position radially offset with respect to the threaded bore 34 therein and diametrically opposed to the location of the flat portion 41 of said plate. This set screw has a tool engaging hexagonal socket 44 formed in its outer face, whilst its inner end is adapted to bear against the bottom face 45 of the inset 40 formed in the slide. The clamp set screw 42 functions, when turned by a tool in a direction to advance it through the plate toward the slide, to force the clamp screw side of the plate away from the slide, and set up a rotary, adjustment screw clamping tension therein which locks the clamp plate on the advancement screw. The plate further acts like a lever of the first class that is fulcrumed along its flat portion 41 against the slide and is raised at its opposed end by the clamp screw, to thus set up forces tending to pull the adjustment screw 33 from its threaded bore 34 and setting up an additional outer locking thrust of the threads on the advancement screw against their cooperative threads in the said bore. Thus it will be seen that I have provided a reliable and simplified camber adjuster for squaring shear slides which is readily accessible by an operator standing at his usual station along the front of the machine, said camber adjusters being positively locked in operative positions without affecting the settings of the adjustment screws for the device.

What is claimed is:

1. In a camber adjusting device for a squaring shear slide, the combination with a cutting blade attached to the lower end portion of the slide and a slide back brace disposed substantially normal to the slide and having its forward edge adjacent the lower cutter blade attachment portion of the slide of a row of spaced pull up connections between the said portion of the slide and the edge of the back brace, expansible means interposed in each pull up connection acting to continuously pull the cutter blade attachment portion of the slide toward the edge of the back brace, the combined capacities of the said means being sufficient to flex the slide in a direction normal to the longitudinal extent of the said cutter blade attachment portion, a series of spaced adjustment devices interposed in the row of pull up connections and each acting to urge the said cutter blade attachment portion of the slide away from the edge of said back brace to space the slide away from the brace in counteraction to the adjacent pull up devices, and means for locking the adjustment devices in operative positions.

2. In combination with a slide, a cutter blade on the lower edge of the slide, a back brace for the said lower edge of the slide, a row of continuously active, resilient draw up connections between the slide and back brace for resiliently urging the lower edge of the slide toward the back brace, and a series of adjustment screws interposed in the row of draw up connections, said series being threaded in the slide to bear against the back brace and acting on the said lower edge of the said slide to urge said edge away from the back brace.

3. In a camber adjusting device for a squaring shear slide, the combination with a cutting blade mounted on the lower end portion of the slide and a slide back brace disposed substantially normal to the slide and having its forward edge adjacent the said lower end of the slide of a row of spaced securing means between the said lower end of the slide and the edge of the back brace to urge the slide toward the brace, the combined capacities of the said means being sufficient to laterally flex the body of the slide along its lower end portion, a series of adjustment screws counteractive to and interposed in the row of securing means, each of said screws being threaded in a bore formed through the slide and located adjacent the upper edge of the cutting blade, said screw bearing at its rear end against the edge of the brace and having its forward end extending beyond the body of the slide, a clamp plate having a threaded hole formed therethrough for receiving the forward end of the adjustment screw, a flat formed on the plate in engagement with the top edge of the blade, and a clamp screw threaded through the clamp plate at a point opposed to the flat portion thereon and operatively bearing at its inner end against the slide.

References Cited in the file of this patent

UNITED STATES PATENTS

| | | |
|---|---|---|
| 678,002 | Miller | July 9, 1901 |
| 794,127 | Slayton | July 4, 1905 |
| 1,629,918 | Kastler | May 24, 1927 |
| 1,802,513 | Hull | Apr. 28, 1931 |
| 1,843,362 | Hazelton | Feb. 2, 1932 |
| 1,850,917 | Browne | Mar. 22, 1932 |
| 1,866,855 | Kirsten | July 12, 1932 |
| 2,004,238 | Fithian | June 11, 1935 |
| 2,013,195 | Ward | Sept. 3, 1935 |
| 2,245,711 | Rafter | June 17, 1941 |
| 2,487,811 | Karvis | Nov. 15, 1949 |

FOREIGN PATENTS

| | | |
|---|---|---|
| 478,707 | Canada | Nov. 20, 1951 |